(12) United States Patent
Halford

(10) Patent No.: US 11,606,342 B2
(45) Date of Patent: Mar. 14, 2023

(54) SECURE WIRELESS COOPERATIVE BROADCAST NETWORKS

(71) Applicant: Caliola Engineering, LLC, Colorado Springs, CO (US)

(72) Inventor: Thomas R. Halford, Colorado Springs, CO (US)

(73) Assignee: CALIOLA ENGINEERING, LLC, Colorado Springs, CO (US)

( * ) Notice: Subject to any disclaimer, the term of this patent is extended or adjusted under 35 U.S.C. 154(b) by 84 days.

(21) Appl. No.: 17/236,172

(22) Filed: Apr. 21, 2021

(65) Prior Publication Data

US 2021/0385202 A1 Dec. 9, 2021

Related U.S. Application Data

(60) Provisional application No. 63/034,772, filed on Jun. 4, 2020.

(51) Int. Cl.
| | | |
|---|---|---|
| *H04L 29/06* | (2006.01) | |
| *H04L 9/08* | (2006.01) | |
| *H04L 9/32* | (2006.01) | |
| *H04L 9/40* | (2022.01) | |

(52) U.S. Cl.
CPC ........ *H04L 63/0478* (2013.01); *H04L 9/0833* (2013.01); *H04L 9/0841* (2013.01); *H04L 9/3242* (2013.01); *H04L 9/3247* (2013.01); *H04L 2209/80* (2013.01)

(58) Field of Classification Search
CPC ............... H04L 63/0478; H04L 9/0833; H04L 9/0841; H04L 9/3242; H04L 9/3247; H04L 2209/80
See application file for complete search history.

(56) References Cited

U.S. PATENT DOCUMENTS

| | | | | |
|---|---|---|---|---|
| 7,421,578 | B1 * | 9/2008 | Huang | H04L 63/065 370/254 |
| 7,660,983 | B1 * | 2/2010 | Srivastava | H04L 9/0891 713/171 |
| 9,648,547 | B1 * | 5/2017 | Hart | H04W 48/10 |
| 10,652,220 | B1 * | 5/2020 | Ramanujan | H04W 4/44 |
| 2005/0108374 | A1 * | 5/2005 | Pierzga | H04B 7/18504 709/223 |
| 2006/0206708 | A1 * | 9/2006 | Son | H04L 9/0833 713/163 |

(Continued)

FOREIGN PATENT DOCUMENTS

| | | | | |
|---|---|---|---|---|
| EP | 1748615 A1 * | 1/2007 | ......... | H04L 63/0428 |
| EP | 2039053 B1 * | 5/2018 | ......... | H04L 63/0478 |

(Continued)

*Primary Examiner* — Darshan I Dhruv
(74) *Attorney, Agent, or Firm* — Martensen IP; Michael C. Martensen

(57) ABSTRACT

Cryptographically secure data communications between layered groups of devices in a wireless cooperative broadcast network encrypts datagrams twice prior to transmission by a source device, first using an inner layer key that is shared by a first group of devices, and second using an outer layer key that is shared by a second group of devices; the devices of the first group being members of the second group. Received datagrams are recovered by first decrypting with the outer layer key and second decrypting with the inner layer key.

36 Claims, 9 Drawing Sheets

(56) References Cited

U.S. PATENT DOCUMENTS

| | | | | |
|---|---|---|---|---|
| 2007/0055870 A1* | 3/2007 | Bruti | ................ | H04W 12/50 |
| | | | | 713/168 |
| 2007/0186109 A1* | 8/2007 | Nyberg | ................ | H04L 9/0844 |
| | | | | 713/171 |
| 2008/0069350 A1* | 3/2008 | Reinoso | ........... | H04N 21/25883 |
| | | | | 348/E7.071 |
| 2008/0072035 A1* | 3/2008 | Johnson | ................ | H04L 65/611 |
| | | | | 713/153 |
| 2009/0249060 A1* | 10/2009 | Dossett | ................ | H04L 9/0822 |
| | | | | 713/156 |
| 2010/0142711 A1* | 6/2010 | Weis | ................ | H04L 9/3213 |
| | | | | 380/277 |
| 2011/0182426 A1* | 7/2011 | Roosta | ................ | H04L 9/0833 |
| | | | | 380/255 |
| 2011/0296185 A1* | 12/2011 | Kamarthy | ........... | H04L 63/1441 |
| | | | | 713/168 |
| 2013/0054964 A1* | 2/2013 | Messerges | ............ | H04L 9/0833 |
| | | | | 713/171 |
| 2013/0083926 A1* | 4/2013 | Hughes | ................ | H04L 9/3247 |
| | | | | 380/278 |
| 2014/0226821 A1* | 8/2014 | Kurdziel | ................ | H04L 9/0827 |
| | | | | 380/278 |
| 2016/0295413 A1* | 10/2016 | Liu | ................ | H04W 4/08 |
| 2017/0048217 A1* | 2/2017 | Biggs | ................ | H04L 63/0435 |
| 2019/0034920 A1* | 1/2019 | Nolan | ................ | H04L 9/50 |
| 2019/0306124 A1* | 10/2019 | Bild | ................ | H04L 9/0833 |
| 2021/0067495 A1* | 3/2021 | Yuting | ................ | H04L 9/3247 |
| 2021/0084010 A1* | 3/2021 | Alharbi | ................ | H04L 63/062 |

FOREIGN PATENT DOCUMENTS

| | | | | |
|---|---|---|---|---|
| EP | 3979656 A1 * | 4/2022 | ............ | H04L 65/601 |
| JP | 5637401 B2 * | 12/2014 | | |
| WO | WO-2008118227 A2 * | 10/2008 | ............. | H04L 12/18 |

* cited by examiner

SECURE WIRELESS COOPERATIVE BROADCAST NETWORKS

RELATED APPLICATION

The present application relates to and claims the benefit of priority to U.S. Provisional Patent Application No. 63/034,772 filed 4 Jun. 2020, which is hereby incorporated by reference in its entirety for all purposes as if fully set forth herein.

BACKGROUND OF THE INVENTION

Field of the Invention

Embodiments of the present invention relate, in general, to wireless network security and, more particularly, to securing data communications between devices in a wireless cooperative broadcast network.

Relevant Background

Military communications networks are often secured with devices or systems that are approved by national or transnational authorities. In the United States (US), the National Security Agency (NSA) is the cognizant authority and NSA "Type 1" products can be used to secure classified US Government information. These devices and systems are certified by the NSA following a rigorous process that includes testing and formal analysis of cryptographic security, functional security, tamper resistance, emissions security, etc.

The devices and systems that are used to secure military communications networks often use cryptographic algorithms with specifications that are protected by national or transnational authorities. Type 1 products, for example, may implement "NSA Suite A" algorithms. The combination of application-specific, classified cryptographic algorithms with stringent and laborious certification processes act to drive up the per-unit costs of Type 1 devices and systems. These costs are negligible for large platforms—e.g., the radios installed on aircraft carriers or in satellite terminals—but have become significant for small, inexpensive platforms such as handheld radios, unmanned aerial vehicles (UAV), and network-enabled weapons (NEW).

In response to the sometimes prohibitive per-unit costs of traditional communications security (COMSEC) products, several national and transnational authorities have developed policies and procedures which allow their classified networks to be secured with Commercial Off-The-Shelf (COTS) devices and systems. In the US, for example, the NSA's Commercial Solutions for Classified (CSfC) initiative was established to allow COTS products to be used in layered, or nested, configurations to protect classified data up to Top Secret.

FIG. 1 is an example of a CSfC-like solution wherein classified data is protected by nested Virtual Private Network (VPN) tunnels. Data from one device 101 is encrypted first by an inner VPN component 102, and then again by an outer VPN component 103, before being transmitted across a wireless network 104. Each VPN component may be a VPN gateway or a VPN client depending on the network configuration. At the receiving device 105, the doubly-encrypted data is decrypted first by an outer VPN component 106, and then again by an inner VPN component 107. The VPN components used in each layer must be manufactured by different vendors or implement different software. In this manner, an adversary must compromise two independent layers of cryptography, each with a different attack surface, to access the classified data.

The NSA's CSfC initiative is not unique. Other national and transnational authorities are developing similar solutions which allow for COTS cryptographic components to be used in layered configurations to protect classified data. These "layered commercial cryptography" solutions combine COTS devices (e.g., VPNs) and software libraries (e.g., OpenSSL) with protocols that have been vetted by standardization bodies such as the Internet Engineering Task Force (IETF) and the US National Institute of Standards (NIST).

The use of layered commercial cryptography to secure military communications networks yields significant cost savings. Whereas the market size for a Type 1 product may number in the hundreds or thousands, there are millions of commercial VPN components in use today. The scale of commercial markets acts to drive down per-unit costs. Returning to the examples above, COTS devices and systems are much more compatible with the overall per-unit costs of handheld radios, UAVs, and network-enabled weapons.

Unfortunately, military and commercial users have different requirements and, as a result, existing layered commercial cryptography solutions are far from optimal for many military applications. Most significantly, COTS VPN components can typically only protect point-to-point, or "unicast", data communications. This is due to a limitation in the cryptographic protocols that are used to establish the inner and outer layer keys. Specifically, VPNs use the Internet Key Exchange (IKE) for key establishment. IKE was standardized by the IETF in Request for Comments (RFC) 2409 (Version 1) and RFC 7296 (Version 2). IKE first uses a Diffie-Hellman exchange to generate a shared secret between a pair of devices. The cryptographic key used to protect subsequent unicast communications between those devices is next derived from that shared secret via a pseudorandom function (PRF). Many military applications require support for point-to-multipoint, or "multicast", communications, which cannot be secured with IKE. The very use cases requiring multicast are often those that rely on small, inexpensive platforms such as handheld radios, UAVs, and NEWs.

FIG. 2A illustrates one representative military communications network application wherein a UAV 201 provides video surveillance of a battlefield 202. A common video data feed is transmitted to three soldiers on the ground 203, 204, and 205 via a wireless network 206. Standard COTS-based solutions would require the UAV to copy the multicast video feed into three parallel unicast feeds, and each then encrypt each copy of the video feed with a different set of keys prior to transmission. It would be far more bandwidth-efficient to encrypt the multicast feed with one common set of keys that is shared by the UAV and all three soldiers. A point of illustration FIG. 2B provides a graphical comparison of unicast, multicast and broadcast communication networks. While unicast 210 communication is a one-to-one relationship, multicast 220 provides a one-to-several mode of operation with broadcast 230 being a one-to-all protocol.

Alternatives to IKE exist that support point-to-multipoint communications. For example, the Group Domain of Interpretation (GDOI) is defined in RFC 6407. The GDOI distinguishes between two types of devices in a group: a Group Controller and Key Server (GCKS) and the Group Members (GM). The GDOI defines two types of group key exchanges. In a GROUPKEY-PULL exchange, a GM triggers the transmission of a group key from the GCKS upon joining the group. In a GROUPKEY-PUSH exchange, the GCKS triggers the transmission of a new key to a GM if group membership changes or the previous key expires. In both exchanges, the group key is transmitted over a point-to-point channel secured with a pairwise key derived from a Diffie-Hellman exchange. Although the GDOI is an IETF standard that has been implemented in some devices, it has not been widely deployed and is not available in typical COTS VPN components.

The GDOI is an example of a server-centric group key exchange protocol, wherein one device in a group (the GCKS) is responsible for generating the key for the group and the other devices (the GMs) obtain the group key from that device. Group key exchange protocols can also be serverless, wherein each device in the group contributes to group key generation. For example, in the Burmester-Desmedt protocol, each device in a group first generates a public/private key pair and then transmits its public key to the other devices in the group over an insecure channel. The protocol is defined such that each device in the group can finally recover a common group key by suitably combing its own private key with the public keys of the other devices in the group. The Burmester-Desmedt protocol is an example of a multi-party Diffie-Hellman exchange.

The lack of multicast support in COTS VPN components is particularly problematic in networks that use wireless cooperative broadcasting techniques. In most wireless networks, a datagram is transported between its source and destination(s) via a sequence of relays according to a routing protocol such as the Optimized Link State Routing (OLSR) protocol (RFCs 3626 and 7181). Those routing protocols may be optimized for wireless networks, but they operate in much the same way as those used in the wired Internet. In wireless cooperative broadcast networks (WCBN), routing is replaced by a simple flooding mechanism wherein all devices simultaneously retransmit all datagrams.

FIG. 2C illustrates the simple flooding mechanism used in a barrage relay network (BRN), which is an exemplary class of WCBN. In a BRN, time is divided according to a common Time-Division Multiple Access (TDMA) frame structure 240 and transmissions are only permitted at the beginning of time slot boundaries. Suppose that the central node 250 transmits a message on slot "A" of TDMA frame 1. The message is successfully received by those nodes 251 in the network that are one-hop from the source. On slot "B" of TDMA frame 1, the nodes 251 simultaneously and cooperatively retransmit that same message so that it is received by the nodes 252 in the network that are two-hops from the message source. The transmissions can continue in this manner so that every node in the network receives the message. This is an example of cooperative broadcasting. Alternatively, the message flood can be constrained by permitting only R retransmissions, so that only the nodes with H=R−1 hops of the source receive the message. This is an example of hop-constrained cooperative multicasting.

WCBNs do not need to maintain routing tables, which can yield significant bandwidth savings in networks with rapidly varying network topologies. Moreover, in applications with a preponderance of point-to-multipoint traffic, WCBNs are preferred because they are optimized specifically for the delivery of data to multiple destinations (i.e., multicast). BRNs and opportunistic large arrays (OLA) are two types of WCBN. BRNs in particular have been adopted for use by the US Army and US Special Operations Command in their handheld radios.

In light of the above discussion, a need exists to secure data communications between devices in wireless cooperative broadcast networks with layered commercial cryptography. These and other deficiencies of the prior art are addressed by one or more embodiments of the presently disclosed invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Cryptographically secure data communications between layered groups of devices in a wireless cooperative broadcast network encrypts datagrams twice prior to transmission by a source device, first using an inner layer key that is shared by a first group of devices, and second using an outer layer key that is shared by a second group of devices; the devices of the first group forming a subset of the devices in the second group. In one embodiment of the present invention, the outer layer key is shared by all devices in the wireless cooperative broadcast network. Received datagrams are recovered by first decrypting with the outer layer key and second decrypting with the inner layer key.

In one embodiment of the present invention, a wireless communications network includes a plurality of devices configured as a wireless cooperative broadcast network. This formed wireless cooperative broadcast network delivers, in one embodiment, a source message to a locally connected network by means of collaborating devices. Within the wireless cooperative broadcast network one or more groups of devices are designated wherein each of the one or more groups of devices represents a subset of the plurality of devices. For each of these groups of devices, an inner layer cryptographic key is shared among the devices within that group. The inner layer cryptographic key for each group of devices is distinct from the inner layer cryptographic key for any other group. An inner layer encryption/decryption protocol is configured to encrypt/decrypt datagrams broadcast by that group of devices using the inner layer cryptographic key.

The present invention also includes one or more supersets of the one or more groups of devices. For each of the one or more supersets, an outer layer cryptographic key shared among each device within that superset. Again, the outer layer cryptographic key for each superset of devices is distinct from any outer layer cryptographic key for a different superset. Moreover, each outer layer cryptographic key is distinct from any inner layer cryptographic key. Using the outer layer cryptographic key for that superset and an outer layer encryption/decryption protocol, datagrams broadcast by that superset are encrypted/decrypted. In one version of the present invention, a single outer layer cryptographic key is established upon configuration of the wireless cooperative broadcast network. In another version of the present invention the single outer layer cryptographic key is established responsive to a first group communications session requested by a device.

The outer layer cryptographic key can, in one embodiment, be established with a server-centric group key management protocol. In such an instance, the server-centric group key management protocol can be the Group Domain of Interpretation. The outer layer cryptographic key can also be established with a serverless group key management protocol wherein the serverless group key management protocol uses multi-party Diffie-Hellman exchanges.

In yet another embodiment of the present invention, the inner layer cryptographic key can be established with a server-centric group key management protocol. In such an instance the server-centric group key management protocol can be the Group Domain of Interpretation. The inner layer cryptographic key can also be established with a serverless group key management protocol wherein the serverless group key management protocol uses multi-party Diffie-Hellman exchanges.

The inner layer encryption/decryption protocol as well as the outer layer encryption/decryption protocol can include source authentication. In each case the source authentication uses either digital signatures or keyed-hash message authentication codes.

A methodology for secure communication in a wireless cooperative broadcast network, according to one embodiment of the present invention, beings with forming, from a plurality of devices, one or more groups of device. Each of the one or more groups of devices is established as a subset of the plurality of devices and for each subset (group of devices) an inner layer cryptographic key is shared among each device within that subset. The inner layer cryptographic key for each group/subset of devices is distinct meaning the inner layer cryptographic key for every other group of devices/subset is different. And for each groups of devices, an inner layer encryption/decryption protocol is configured to encrypt/decrypt datagrams broadcast by that group of devices using the inner layer cryptographic key for that group of devices.

The method continues by forming one or more supersets from the one or more groups of devices. For each superset, an outer layer cryptographic key is shared among each device within that superset, and, similar to the inner layer cryptographic key, the outer layer cryptographic key for each superset of devices is distinct. Thereafter the process configures an outer layer encryption/decryption protocol for each supersets so as to encrypt/decrypt datagrams broadcast by that superset using its distinct outer layer cryptographic key.

Another methodology for secure communication in a wireless cooperative broadcast network, according to another embodiment of the present invention, begins by selecting an inner layer cryptographic key from one or more inner layer cryptographic keys at a datagram source based on a destination address of a datagram. The datagram is thereafter encrypted using the selected inner layer cryptographic key, yielding a singly-encrypted ciphertext datagram.

The method continues by then selecting an outer layer cryptographic key from one or more outer layer cryptographic keys at the datagram source based on the destination address of the singly-encrypted ciphertext datagram. The singly-encrypted ciphertext datagram from the inner layer is encrypted using the outer layer cryptographic key, yielding a doubly-encrypted ciphertext datagram. The doubly-encrypted ciphertext datagram is thereafter flooded across the wireless cooperative broadcast network.

At each device that shares both the inner layer cryptographic key and outer layer cryptographic key, the doubly-encrypted ciphertext datagram is first decrypted with the outer layer cryptographic key, yielding the singly-encrypted ciphertext datagram, which is thereafter decrypted with the inner layer cryptographic key, yielding the datagram. In other embodiments the method can also limit the hops of the flooding of doubly-encrypted ciphertext datagram to a maximum hop distance between the datagram source and any destination.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
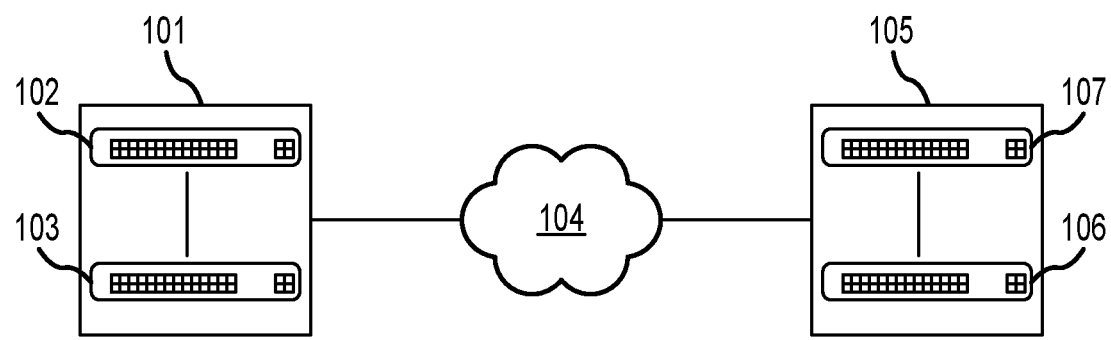
FIG. 1 presents a typical layered unicast VPN encryption protocol as would be known to one of reasonable skill in the relevant art.
Figure 2A:
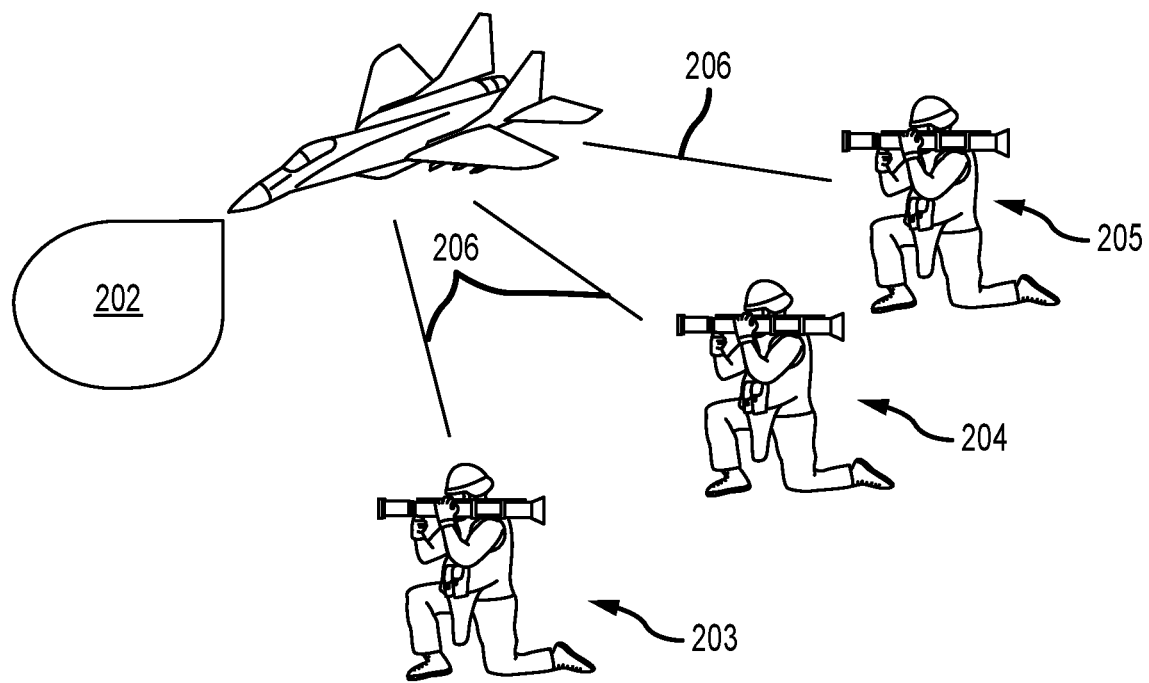
FIG. 2A shows a representative military communications multicast network application as would be known to one of reasonable skill in the relevant art.
Figure 2B:
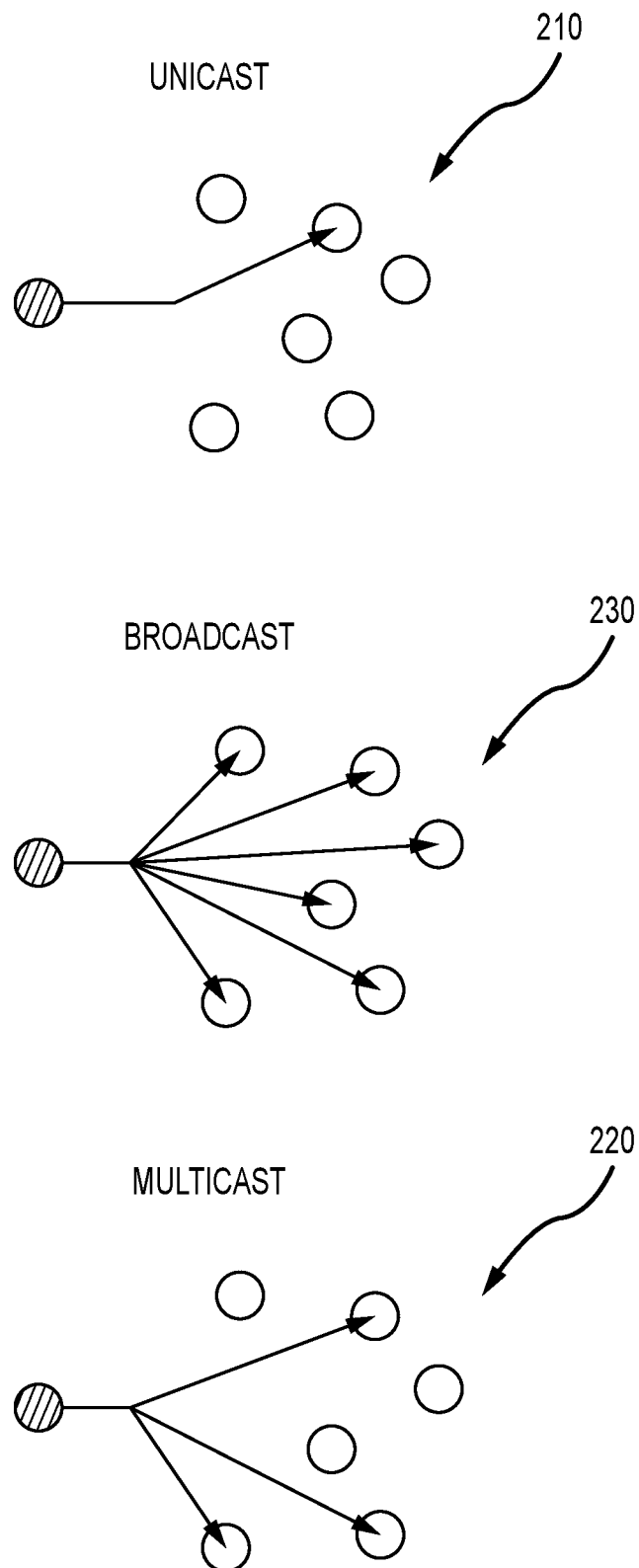
FIG. 2B shows a generic comparison of unicast, multicast and broadcast communication networks as would be known to one of ordinary skill in the relevant art.
Figure 2C:
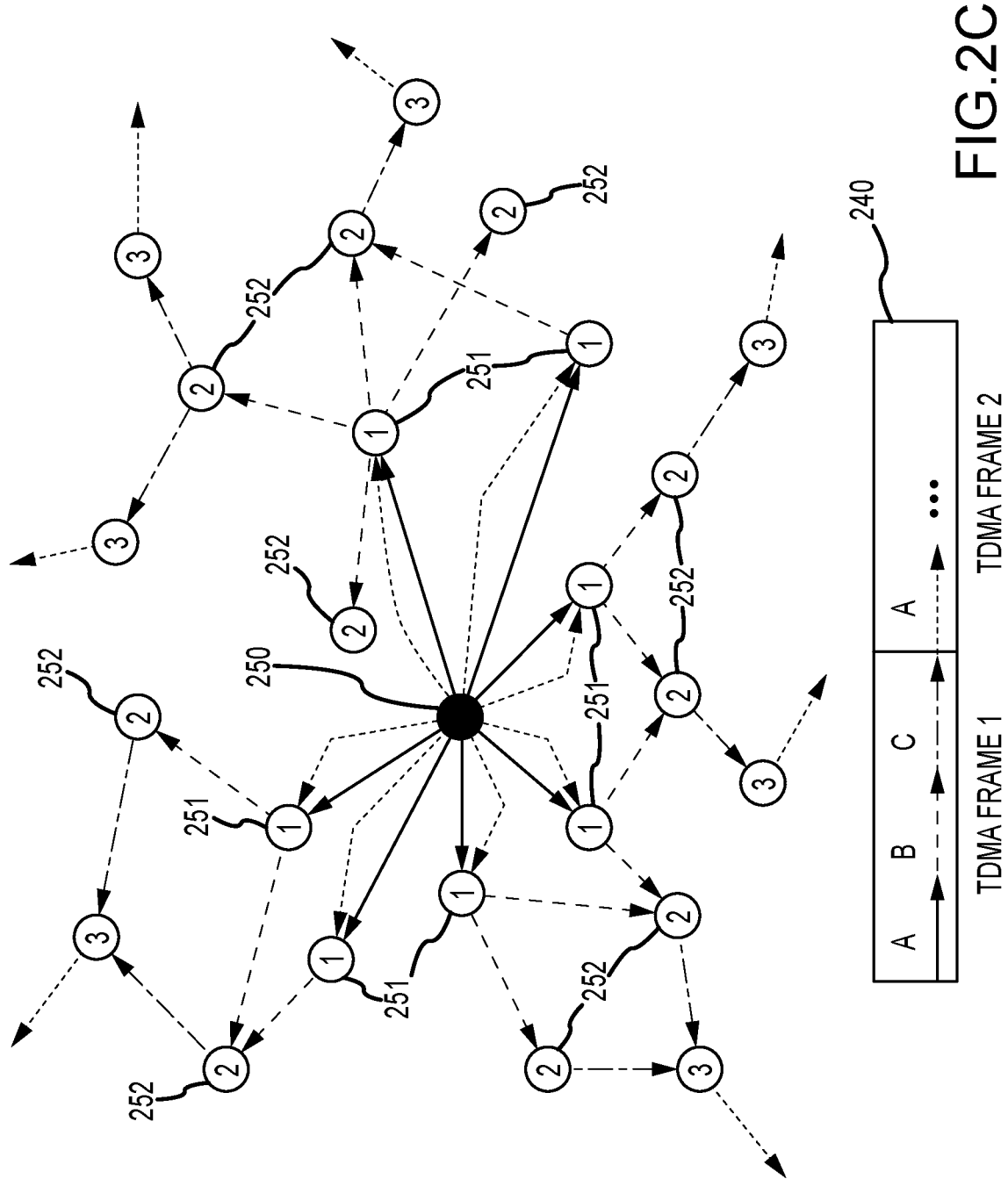
FIG. 2C illustrates the cooperative broadcast mechanism in a representative wireless cooperative broadcast network as would be known to one of ordinary skill in the relevant art.

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A system and method for cryptographically securing data communications between layered groups of devices in a wireless cooperative broadcast network is hereafter disclosed. In one or more embodiments of the present invention, the wireless cooperative broadcast network is a barrage relay network; in other embodiments, the wireless cooperative broadcast network is an opportunistic large array. Datagrams are encrypted, in one embodiment, twice prior to transmission by a source device, first using an inner layer key that is shared by a first group of devices, and second by using an outer layer key shared by a second group of devices; the devices of the first group being a subset of the members of the second group. In some embodiments, the outer layer key is shared by all devices in the wireless cooperative broadcast network. Received datagrams are recovered by first decrypting with the outer layer key and then by a second decrypting using the inner layer key.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

For the purpose of the present invention the following terms understood to mean the following.

Datagram—A datagram is a basic transfer unit associated with a packet-switched network. Datagrams are typically structured in header and payload sections and provide a connectionless communication service across a packet-switched network. The delivery, arrival time, and order of arrival of datagrams need not be guaranteed by the network.

Unicast—In networking, unicast is a one-to-one transmission from one point in the network to another point; that is, one sender and one receiver, each identified by a network address. Unicast is in contrast to multicast and broadcast which are one-to-many transmissions.

Multicast—In networking, multicast is a one-to-many transmission from one point in the network to a plurality of other points; that is, one sender and more than one receiver. The receivers may be identified by a common multicast or group network address.

Broadcast—In networking, broadcast is a special case of multicast wherein the one-to-many transmission is from one point in the network to all other points in the network. The receivers may be identified by a common broadcast address for the network.

Cooperative Transmission—In wireless networking, cooperative transmission is a many-to-many transmission wherein a plurality of nodes coordinate their respective emissions so that a common datagram is transmitted to a plurality of receivers.

Cooperative Broadcasting—In wireless networking, cooperative broadcasting refers to any means of broadcasting datagrams via a plurality of cooperative transmissions. BRNs and OLAs are examples of wireless networks that rely on cooperative broadcasting.

Cooperative Multicasting—In wireless networking, cooperative multicasting refers to any means of multicasting datagrams via a plurality of cooperative transmissions.

Set—The term "set" refers to a well-defined collection of distinct objects. A set X is a "superset" of another set Y if every element of Y is contained in X. A set X is a "proper superset" of Y if X is a subset of Y and there is at least one element contained in X that is not also contained in Y.

Embodiments of the present invention and many of its improvements are hereafter described with a degree of particularity. It should be understood that the description that follows is made by way of example, and that the invention is defined by the scope of the claims appending the description.

Cryptographically secure data communications between devices in a Wireless Cooperative Broadcasting Network (WCBN) is hereafter disclosed by way of example. The present invention establishes, maintains, and uses two or more sets of cryptographic keys to encrypt and decrypt datagrams. Each inner layer key is shared by a set of two or more devices forming a group. Each outer layer key is shared by a superset of groups that each share an individually distinct inner layer key. In one or more embodiments of the present invention, a single outer layer key is shared by all devices in the network while each inner layer key is unique. In other embodiments, inner and outer key pairs are shared by the same sets of devices. Datagrams that are destined to one or more receiving devices are encrypted twice by a source device, first using an inner key that is shared only by the receiving device(s) and second using an outer key that is shared by the receiving device(s) with the superset, and possibly other devices. At each receiving device, the doubly-encrypted datagram is decrypted twice, first by using the outer key and second by using the inner key.

Embodiments of the present invention can also be distinguished by how group keys are established (i.e., serverless or sever-centric), by which devices share the outer layer key(s), and by whether the outer layer keys are established as the WCBN forms or on-demand. In the following description, three specific classes of embodiments are described by example. As would be apparent to one of ordinary skill in the relevant art, other classes of embodiments can be defined by combining features of the three described below.

Proactive Server-Centric Outer Layer/Server-Centric Inner Layer

In one or more embodiments of the present invention a "proactive" outer layer is coupled with a single outer layer key that is shared by all devices in the wireless cooperative broadcast network. In some such embodiments, the outer layer key is established as the network forms. In other such embodiments, the outer layer key is established when the first group communications session is requested by a network device.

In embodiments of the present invention with a "proactive server-centric" outer layer, a unique device in the WCBN is responsible for generating the outer layer group key. This device is referred to as the Outer (layer) Key Server (OKS) herein. In this embodiment using a server-centric group key exchange protocol, a specific node in a group—the server (OKS)—is responsible for generating the cryptographic key for that group. The other group members thereafter request copies of that key from the server. The device that serves as the OKS may change over time in response to changing network conditions. In some embodiments in which the WCBN is also a barrage relay network, the device that provides the time reference for the network at any given instant in time may be the OKS.

At this point, it is instructive to consider a specific example as a means of establishing the terminology used herein. Consider the seven-device (node) wireless cooperative broadcast network illustrated in FIG. 3. The central device 301 is the OKS in this example. The other devices 302, 303, 304, 305, 306, 307 can each pull the outer layer key from the OKS 301 via a server-centric group key exchange protocol. While in this illustration the OKS 301 is graphically in the center of a seven-device network, the orientation of the OKS 301 is merely for illustration purposes. Note also that the outer layer key is relayed when necessary to those devices 304, 307 lacking direct contact with the OKS 301. Responsive to one or more devices leaving the WCBN, the OKS 301 generates a new outer layer key and pushes it to the remaining devices via that same protocol.

Figure 3:
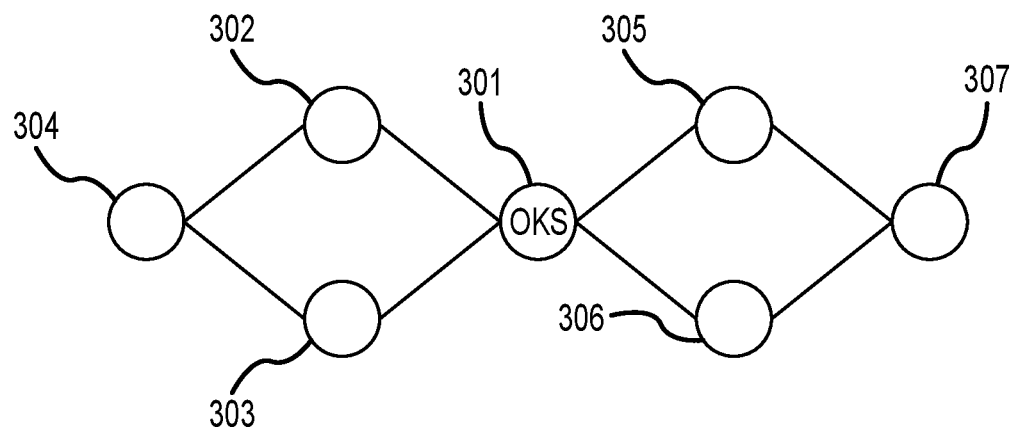
FIG. 3 presents a proactive server-centric outer layer/server-centric Inner Layer seven-device wireless collaborative broadcast network according to one embodiment of the present invention.

In embodiments of the present invention with a "server-centric" outer layer as shown in FIG. 3, inner layer groups can be formed. In each case a unique device within each group is responsible for generating the inner layer key for that group. This device is referred to as an Inner Group Key Server (IGKS). Continuing the example from FIG. 3 and with additional reference to FIG. 4, recall an outer layer key has been established with a central device 401 acting as the OKS. A need, nonetheless, for secure communications between two sets of devices in the network is required. A first group 408 designates a device 402 as its IGKS with other devices 403, 405, 406 joining the group as Inner Group Members (IGM). A second group 409 also designates a device 407 has as its IGKS with three additional devices 401, 405, 406 as IGMs. Similar to the outer layer, the inner layer IGMs pull the appropriate inner layer group keys from the IGKSs 402, 407 via a server-centric group key exchange protocol. Since devices 405 and 406 participate in both groups, they will pull both inner layer keys.

As would be apparent to one of ordinary skill in the relevant art, in some embodiments, the group key exchange protocol used to establish group keys in one or both of the layers may use source authentication. In this manner, the IGKS can verify the trustworthiness of the IGMs and vice versa. In some embodiments of the present invention, one or more of the group key exchange messages are digitally signed using a device-specific private key, the corresponding public key for which is known to all devices in the WCBN. In other embodiments of the present invention, one or more of the group key exchange messages include a keyed-hash message authentication code (HMAC) that is generated with a pre-shared key (PSK).

Figure 4:
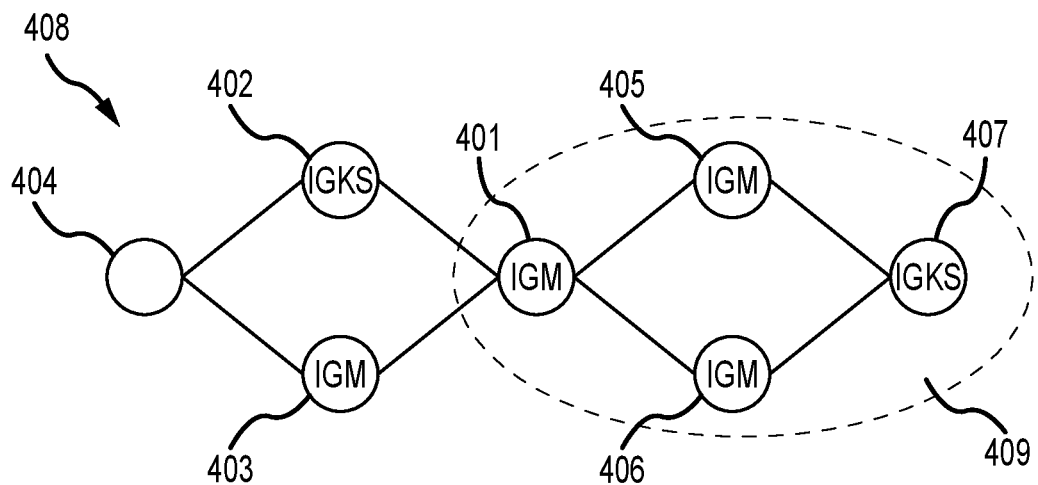
FIG. 4 presents the seven-device wireless collaborative broadcast network first presented in FIG. 3 with additional inner-layer groupings, according to one embodiment of the present invention.

Once the outer and inner layer keys are established, data communications between the first group 408 in FIG. 4 is secured as follows. Datagrams that originate at a device 402 (resp., 403, 405, or 406) are encrypted first with the inner layer group key and next with common outer layer key for the network. In this example, the IGKS 402 originates a communication. One or reasonable skill in the relevant art will appreciate that any device within an inner group can initiate a communication to other members within that group. The doubly-encrypted datagrams are then transmitted to the other group members via the cooperative broadcasting mechanism that defines the WCBN. Each receiving group member recovers the plaintext datagram by decrypting twice, first with the outer key and next with the inner key. Data communications between the second group 409 in FIG. 4 is secured in a similar fashion, but with a different inner layer key. Device(s) 404 outside one or both inner groups also receive the doubly-encrypted transmissions however as they lack the proper keys the transmission are meaningless.

Observe that the doubly-encrypted datagrams that originate at any member of the first group 408 will be relayed, in this example, by a central device 401 to other members of the group, and indeed to other devices in the network. Since this central device 401 shares the common outer layer group key for the network, it could, in principle, decrypt the outer encryption layer. However, it will be unable to recover the original plaintext from the resulting singly encrypted datagram since it lacks the appropriate inner layer group key.

Reactive Serverless Outer Layer/Serverless Inner Layer

Figure 5:
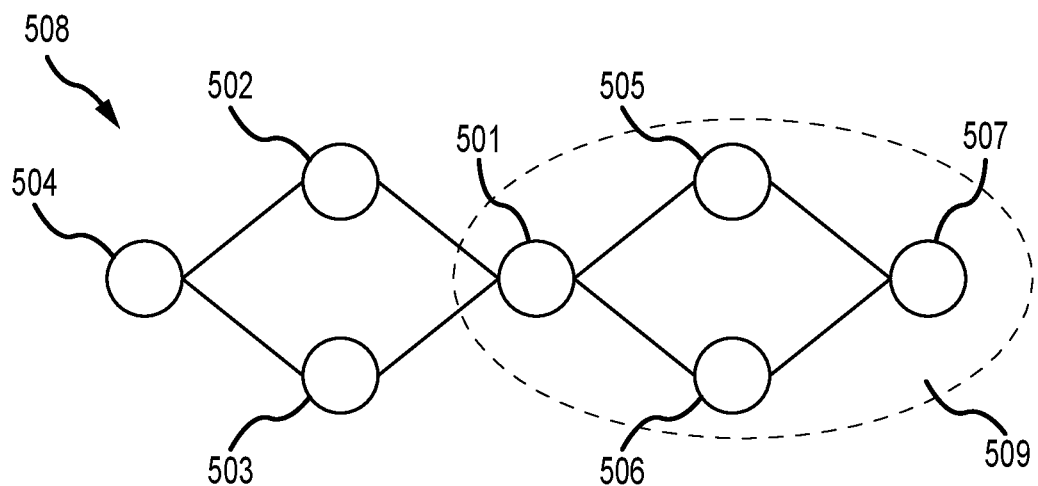
FIG. 5 presents a serverless outer layer/serverless inner layer seven-device wireless collaborative broadcast network according to one embodiment of the present invention.

In another embodiment of the present invention a "reactive" outer layer is established. A reactive outer layer forms a different outer layer key for each group and that outer layer key is shared only by the group members. It is again instructive to consider a specific example to establish the terminology used herein. Consider the seven-device network in FIG. 5. Similar to FIG. 4, there are two groups. The first group 508 comprises four devices 502, 503, 505, 506. The second group 509 also comprises four devices 501, 505, 506, 507 with two device 505, 506 being members of both groups. In one embodiments of the invention, each group would first establish an outer layer key using a serverless group key exchange protocol and next establish an inner layer key using the same serverless group key exchange protocol. Note that in a serverless group key exchange protocol, cryptographic keys are generated by combining random data from all group members. Multi-party Diffie Hellman exchanges are an example of a serverless group key exchange protocols. In other embodiments, the inner key would be established first. In yet other embodiments, the ordering is arbitrary.

Once the outer and inner layer keys are established for both groups, data communications within the groups would proceed as above. The key difference between this example and that considered in a proactive server-centric approach lies in the processing at the central device (i.e., IGM 401 in FIG. 4 or the central device 501 in FIG. 5). Whereas the IGM 401 in FIG. 4 can decrypt the outer layer of encryption, the central device 501 shown in FIG. 5 cannot because it does not share the appropriate outer layer key. These two examples thus serve to highlight an important tradeoff between embodiments using proactive and reactive outer layers. Proactive outer layers are less complex because there is a common key used in the outer layer for all groups. However, in the proactive approach, data is only protected by a single layer of encryption as it transits through relaying devices in the WCBN. Reactive outer layers maintain two layers of encryption for all data-in-transit. This comes at the cost of increased complexity and the possible disclosure of the group structure of the WCBN to adversarial eavesdroppers.

Hybrid Outer Layer

In another embodiments of the present invention a "hybrid" outer layer is created. In a hybrid outer layer approach there may be one or more outer layer keys in the network and any given outer layer key may be a superset of one or more inner groups. Embodiment with hybrid outer layers may use a server-centric or serverless group key exchange protocol, and they may be paired with a server-centric or serverless inner layer.

Different embodiments of the present invention with a hybrid outer layer may use different heuristics for selecting outer layer group members. For example, in some embodiments with hybrid outer layers, an outer layer key may be established between any device that is D or less hops from any group member, where D is the maximum distance in hops between any pair of devices in the group. This heuristic may be suitable in WCBNs that support hop-constrained multicasting—i.e., a flood whose extent is limited in hops.

Figure 6:
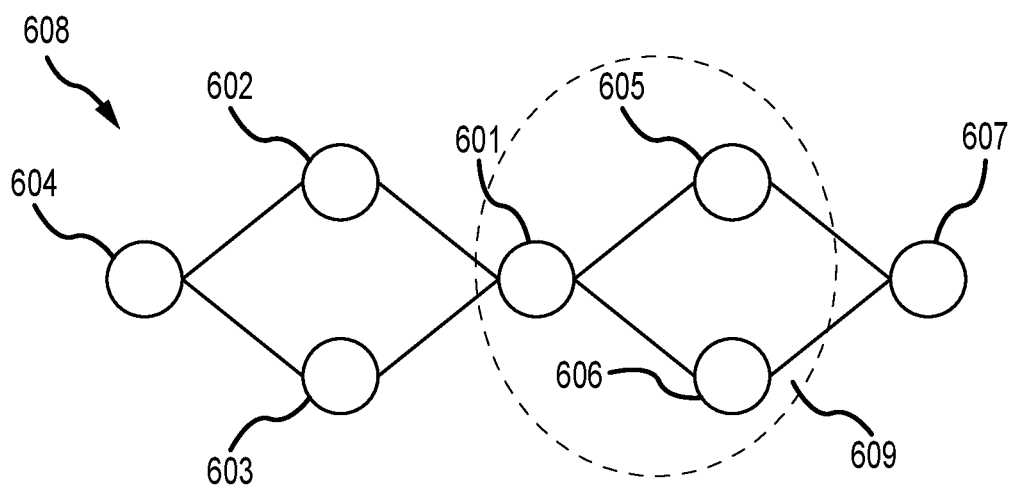
FIG. 6 presents a hybrid outer layer seven device wireless collaborative broadcast network according to one embodiment of the present invention.

Consider the seven-device network in FIG. 6. In this example a single group 608 is comprised of three devices: 601, 605, 606. The maximum distance between any pair of devices in the group 608 is set at D=1. A serverless or server-centric group key exchange protocol establishes an outer layer key for this group 608 at devices 601, 602, 603, 605, 606, and 607. Note the left most device 604 is at a distance of D=2 and is outside the group. A second group key exchange protocol establishes an inner key at the group members only (601, 605, and 606). Once the inner and outer keys are established, a datagram from a device 605 in the group 608 is encrypted using both keys and transmitted with a 1-hop constrained broadcast. The doubly-encrypted datagram is received by two devices 601, 607. Only one device 601 possesses both keys—with the other device 607, which only has the outer key.

Secure Unicast Communications

The present invention is not limited to communications between groups of three or more devices. In embodiments with a proactive outer layer for example, a key exchange protocol can be used to establish an inner layer key between pairs of devices. Datagrams would then be encrypted first using the pairwise inner key and second with the common outer group key. In embodiments with a reactive inner layer, there would be pairwise keys in both layers for a secure unicast session.

Figure 7:
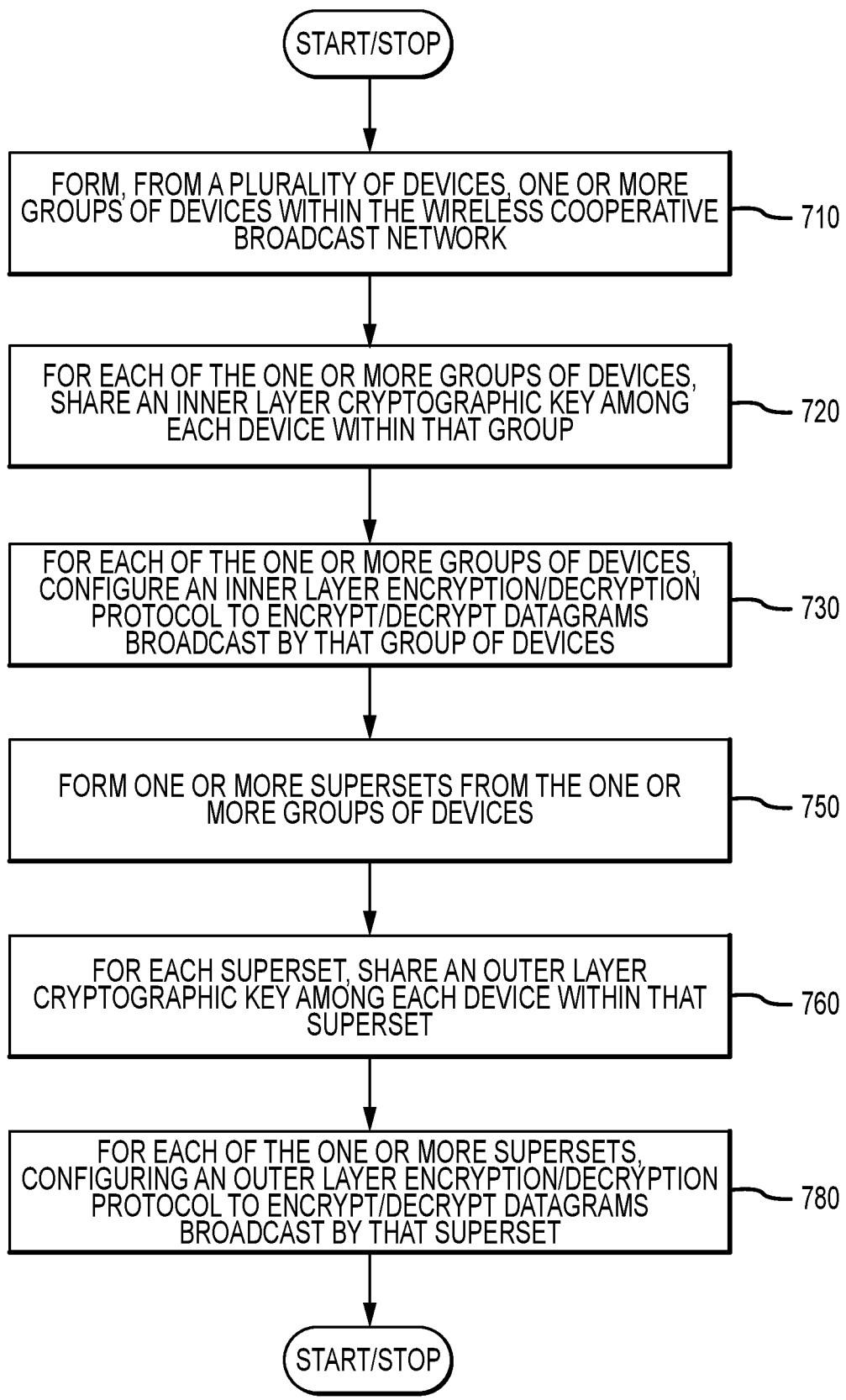
FIG. 7 is a methodology for secure communication in a wireless cooperative broadcast network according to one embodiment of the present invention.

FIGS. 7 and 8 present flowcharts depicting examples of the methodology which may be used secure communications in a wireless cooperative broadcast network. In the description that follows, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

One methodology for secure communication in a cooperative broadcast network begins by forming 710, from a plurality of devices, one or more groups of devices within the wireless cooperative broadcast network. Each of the groups of devices formed is a subset of the plurality of devices. The members of each group are not exclusive, meaning one or more of the plurality of devices may exist in multiple groups.

For each groups of devices an inner layer cryptographic key is selected and shared 720 among each device within that group. Moreover, the inner layer cryptographic key for each group of devices is distinct. Therefore, a device, as a member of multiple groups, will possess a distinct inner layer cryptographic key for each group. Using the inner layer cryptographic key for each group of devices, datagrams broadcast by that group can be configured (encrypted) 730 based on an inner layer encryption/decryption protocol.

As with the inner groups, a larger outer layer of devices is formed 750 as one or more supersets from the previously formed groups. For each superset, an outer layer cryptographic key is selected and shared 760 among each device within that superset. As with the inner layer cryptographic key, the outer layer cryptographic key for each superset of devices is distinct.

Similarly, datagrams broadcast by devices within a superset use the outer layer cryptographic key to encrypt 780 those datagrams for that superset based on an outer layer encryption/decryption protocol. According to one embodiment of the present invention, secure communications in a wireless cooperative broadcast network uses (at least) doubly-encrypted broadcast datagrams that flood the network; first encrypted at the inner layer and second encrypted at the outer layer. Devices receiving the broadcast must possess both the outer layer cryptographic key and the inner layer cryptographic key to decrypt the message.

As previously mentioned the outer layer cryptographic key can be established with a server-centric group key management protocol. In one version of the present invention the server-centric group key management protocol is the Group Domain of Interpretation. The outer layer cryptographic key can also be established with a serverless group key management protocol using multi-party Diffie-Hellman exchanges.

In other embodiments the inner layer cryptographic key can be established with a server-centric group key management protocol based on a Group Domain of Interpretation. The inner layer cryptographic key can also be established with a serverless group key management protocol using, in one embodiment, multi-party Diffie-Hellman exchanges.

Source authentication can also be used to configure the inner and/or outer layer encryption/decryption protocol. In each case, source authentication can use digital signatures and/or keyed-hash message authentication codes.

Figure 8A:
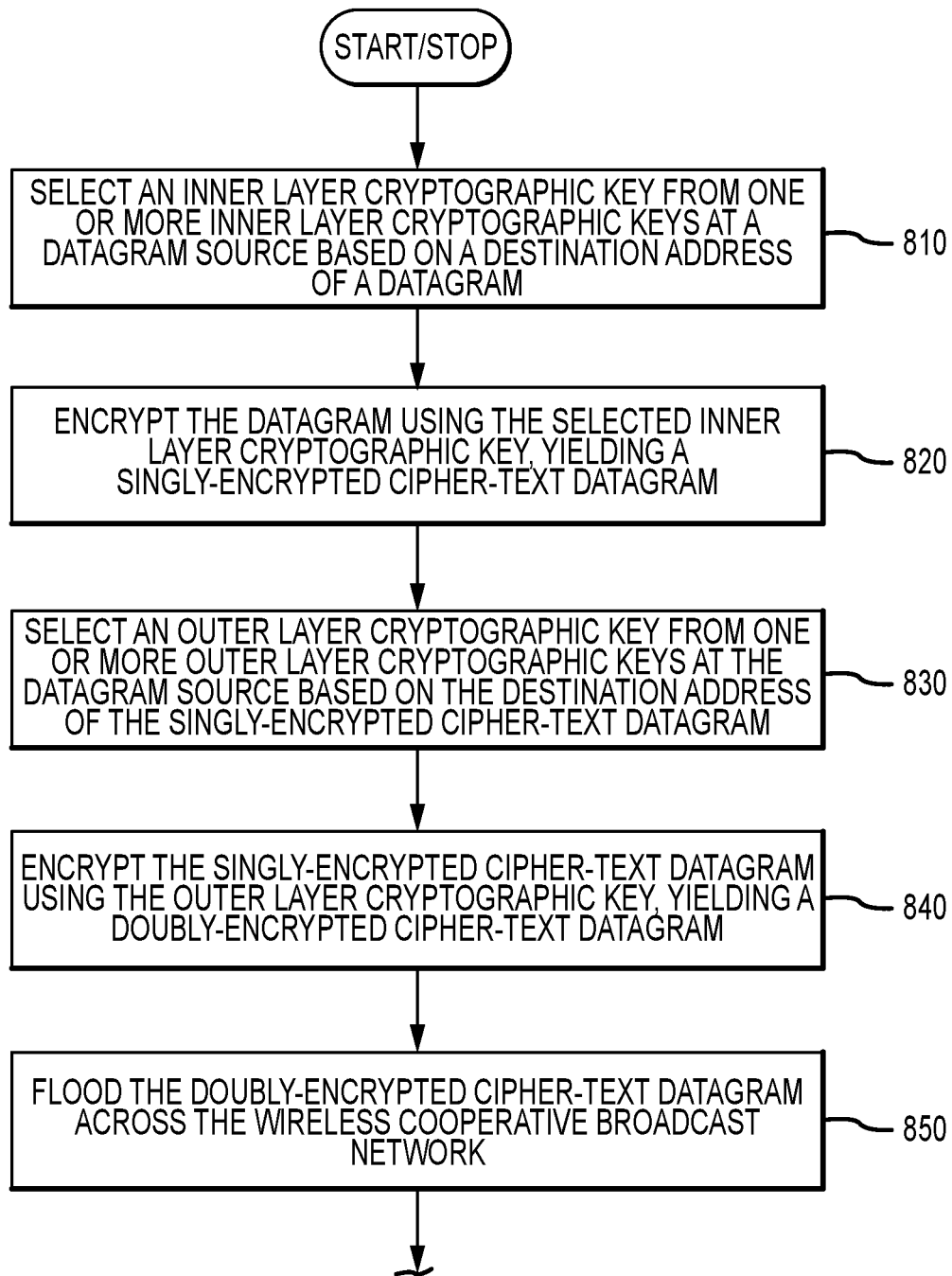
FIGS. 8A and 8B present another methodology for secure communication in a wireless cooperative broadcast network according to one embodiment of the present invention.
Figure 8B:
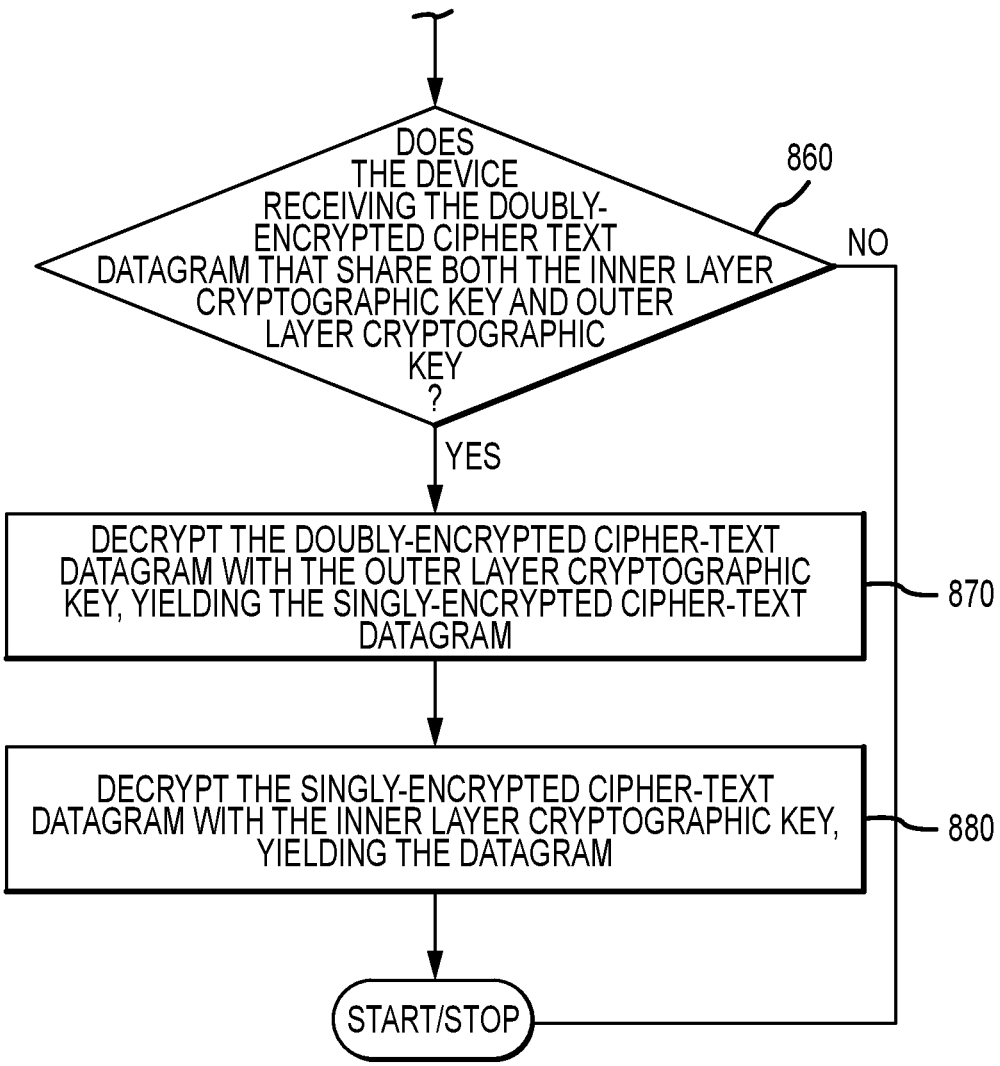

Another methodology for secure communications in a cooperative broadcast network is illustrated in FIGS. 8A and 8B. The process begins by selecting 810 an inner layer cryptographic key from one or more inner layer cryptographic keys at a datagram source based on a destination address of a datagram. The datagrams are then encrypted 820 using the selected inner layer cryptographic key, yielding a singly-encrypted ciphertext datagram.

An outer layer cryptographic key is selected 830 from one or more outer layer cryptographic keys at the datagram source based on the destination address of the singly-encrypted ciphertext datagram. While in this example the inner layer key and encryption is accomplished first, the order is not determinative.

In this embodiment the outer layer cryptographic key encrypts 840 the singly-encrypted ciphertext datagram yielding a doubly-encrypted ciphertext datagram. The doubly-encrypted ciphertext datagram is thereafter flood 850 across the wireless cooperative broadcast network.

As a device in the wireless cooperative broadcast network receives the doubly-encrypted ciphertext datagram in inquiry 860 is made whether the device shares both the inner layer cryptographic key and outer layer cryptographic key. If the answer is no, the process ends. When the answer is yes the doubly-encrypted ciphertext datagram is decrypted 870, in this embodiment, with the outer layer cryptographic key, yielding the singly-encrypted ciphertext datagram and thereafter decrypted 880 with the inner layer cryptographic key, yielding the datagram.

In another embodiment of the present invention the number of hops of the doubly-encrypted ciphertext datagram can be limited to a maximum hop distance between the datagram source and any destination.

The present invention establishes, maintains, and uses two or more sets of cryptographic keys to encrypt and decrypt datagrams in a wireless cooperative broadcast network. In doing so the invention leverages the advantage of broadcast transmission of datagrams while providing secure communication.

It will be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general-purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random-access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

While there have been described above the principles of the present invention in conjunction with secure communications in a wireless cooperative broadcast network, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

What is claimed is:
1. A wireless communications network, comprising:
a plurality of devices, each device including one or more processors and non-transitory memory having a plurality of instructions executable by one of the one or more processors, configured as a wireless cooperative broadcast network;
one or more groups of devices within the wireless cooperative broadcast network, wherein each of the one or more groups of devices are a subset of the plurality of devices;
for each of the one or more groups of devices, a distinct inner layer cryptographic key shared by one of the one or more processors among each device within the each of the one or more groups of devices;
an inner layer encryption/decryption protocol used by one of the one or more processors to encrypt/decrypt datagrams broadcast by at least one device within the each of the one or more groups of devices using the distinct inner layer cryptographic key;
one or more supersets from the plurality of devices wherein each of the one or more supersets includes at least one of the one or more groups of devices and wherein each of the one or more groups of devices is contained within at least one of the one or more supersets;
for each of the one or more supersets, a distinct outer layer cryptographic key shared by one of the one or more the processors among each device within the one or more groups of devices within each of the one or more supersets; and for each of the one or more supersets, an outer layer encryption/decryption protocol used by one of the one or more processors to encrypt/decrypt datagrams broadcast by each device of the each of the one or more supersets using the distinct outer layer cryptographic key for the each of the one or more supersets.

2. The wireless communications network of claim 1, wherein each distinct outer layer cryptographic key is established with a server-centric group key management protocol.

3. The wireless communications network of claim 2, wherein the server-centric group key management protocol is the Group Domain of Interpretation.

4. The wireless communications network of claim 1, wherein each distinct outer layer cryptographic key is established with a serverless group key management protocol.

5. The wireless communications network of claim 4, wherein the serverless group key management protocol uses multi-party Diffie-Hellman exchanges.

6. The wireless communications network of claim 1, wherein each distinct inner layer cryptographic key is established with a server-centric group key management protocol.

7. The wireless communication network of claim 6, wherein the server-centric group key management protocol is the Group Domain of Interpretation.

8. The wireless communications network of claim 1, wherein each distinct inner layer cryptographic key is established with a serverless group key management protocol.

9. The wireless communications network of claim 8, wherein the serverless group key management protocol uses multi-party Diffie-Hellman exchanges.

10. The wireless communications network of claim 1, wherein the inner layer encryption/decryption protocol further comprises source authentication.

11. The wireless communications network of claim 1, wherein the outer layer encryption/decryption protocol further comprises source authentication.

12. The wireless communications network according to either claim 10 or claim 11, wherein source authentication uses digital signatures.

13. The wireless communications network according to either 10 or claim 11, wherein source authentication uses keyed-hash message authentication codes.

14. The wireless communications network of claim 1, further comprising a single outer layer cryptographic key shared among each of the plurality of devices.

15. The wireless communications network of claim 14, wherein the single outer layer cryptographic key is established upon configuration of the wireless cooperative broadcast network.

16. The wireless communications network of claim 14, wherein the single outer layer cryptographic key is established responsive to a first group communications session requested by a device.

17. The wireless communications network of claim 1, wherein a different outer layer cryptographic key is shared with each device within each of the one or more groups.

18. A method for secure communication in a wireless cooperative broadcast network comprising:

forming, from a plurality of devices, one or more groups of devices within the wireless cooperative broadcast network, wherein each of the one or more groups of devices are a subset of the plurality of devices, and wherein each of the plurality of devices includes one or more processors and non-transitory memory having a plurality of instructions executable by the one or more processors to perform at least the following;

for each of the one or more groups of devices, sharing a distinct inner layer cryptographic key among each device within the each of the one or more groups of devices;

for each of the one or more groups of devices, using an inner layer encryption/decryption protocol to encrypt/decrypt datagrams broadcast by at least one device within the each of the one or more groups of devices using the distinct inner layer cryptographic key;

forming one or more supersets from the plurality of devices wherein each of the one or more supersets includes at least one of the one or more groups of devices and wherein each of the one or more groups of devices is contained within at least one of the one or more supersets;

for each of the one or more supersets, sharing a distinct outer layer cryptographic key among each device within the each of the one or more supersets; and for each of the one or more supersets, using an outer layer encryption/decryption protocol to encrypt/decrypt datagrams broadcast by each device of the each of the one or more supersets using the distinct outer layer cryptographic key.

19. The method for secure communication in a wireless cooperative broadcast network according to claim 18, further comprising establishing each distinct outer layer cryptographic key with a server-centric group key management protocol.

20. The method for secure communication in a wireless cooperative broadcast network according to claim 19, wherein the server-centric group key management protocol is the Group Domain of Interpretation.

21. The method for secure communication in a wireless cooperative broadcast network according to claim 18, further comprising establishing each distinct outer layer cryptographic key with a serverless group key management protocol.

22. The method for secure communication in a wireless cooperative broadcast network according to claim 21, wherein the serverless group key management protocol uses multi-party Diffie-Hellman exchanges.

23. The method for secure communication in a wireless cooperative broadcast network according to claim 18, further comprising establishing each distinct inner layer cryptographic key with a server-centric group key management protocol.

24. The method for secure communication in a wireless cooperative broadcast network according to claim 23, wherein the server-centric group key management protocol is the Group Domain of Interpretation.

25. The method for secure communication in a wireless cooperative broadcast network according to claim 18, further comprising establishing each distinct inner layer cryptographic key with a serverless group key management protocol.

26. The method for secure communication in a wireless cooperative broadcast network according to claim 25, wherein the serverless group key management protocol uses multi-party Diffie-Hellman exchanges.

27. The method for secure communication in a wireless cooperative broadcast network according to claim 18, further comprising using source authentication for configuring the inner layer encryption/decryption protocol.

28. The method for secure communication in a wireless cooperative broadcast network according to claim 18, further comprising using source authentication for configuring the outer layer encryption/decryption protocol.

29. The method for secure communication in a wireless cooperative broadcast network according to either claim 27 or claim 28, wherein source authentication uses digital signatures.

30. The method for secure communication in a wireless cooperative broadcast network according to either claim 27 or claim 28, wherein source authentication uses keyed-hash message authentication codes.

31. The method for secure communication in a wireless cooperative broadcast network according to claim 18, further comprising sharing a single outer layer cryptographic key among each of the plurality of devices.

32. The method for secure communication in a wireless cooperative broadcast network according to claim 31, further comprising establishing the single outer layer cryptographic key upon configuration of the wireless cooperative broadcast network.

33. The method for secure communication in a wireless cooperative broadcast network according to claim 31, further comprising establishing the single outer layer cryptographic key responsive to a first group communications session requested by a device.

34. The method for secure communication in a wireless cooperative broadcast network according to claim 18, further comprising sharing a different outer layer cryptographic key with each device within each of the one or more groups.

35. A computer implemented method for secure communication in a wireless cooperative broadcast network comprising:

selecting, at a device within one of one or more inner groups of devices, an inner layer cryptographic key shared among each device within the one of one or more inner groups of devices;

encrypting a datagram using the selected inner layer cryptographic key, yielding a singly-encrypted ciphertext datagram;

selecting an outer layer cryptographic key from one or more outer layer cryptographic keys shared among each device within an outer group of devices wherein the one of the one or more inner groups of devices is a subset of the outer group of devices;

encrypting the singly-encrypted ciphertext datagram using the selected outer layer cryptographic key, yielding a doubly-encrypted ciphertext datagram;

flooding the doubly-encrypted ciphertext datagram across the wireless cooperative broadcast network; and at each device that shares both the selected inner layer cryptographic key and the selected outer layer cryptographic key, decrypting the doubly-encrypted ciphertext datagram with the selected outer layer cryptographic key, yielding the singly-encrypted ciphertext datagram, and decrypting the singly-encrypted ciphertext datagram with the selected inner layer cryptographic key, yielding the datagram.

36. The method for secure communication in a wireless cooperative broadcast network of claim 35, further comprising limiting hops of the flooding of doubly-encrypted ciphertext datagram to a maximum hop distance between the datagram source and any destination.

* * * * *

UNITED STATES PATENT AND TRADEMARK OFFICE
CERTIFICATE OF CORRECTION

| | |
|---|---|
| PATENT NO. | : 11,606,342 B2 |
| APPLICATION NO. | : 17/236172 |
| DATED | : March 14, 2023 |
| INVENTOR(S) | : Thomas R. Halford |

It is certified that error appears in the above-identified patent and that said Letters Patent is hereby corrected as shown below:

In the Claims

Column 16, Line 67, cancel "the" after 'more'.
Column 17, Line 44, add --claim-- before '10'.

Signed and Sealed this
Twenty-sixth Day of December, 2023

*Katherine Kelly Vidal*

Katherine Kelly Vidal
*Director of the United States Patent and Trademark Office*